United States Patent [19]
Östlund

[11] Patent Number: 5,828,311
[45] Date of Patent: Oct. 27, 1998

[54] CIRCUITRY AND METHOD FOR ACCESSING A RADIO PAGER

[75] Inventor: Anders Östlund, Gothenburg, Sweden

[73] Assignee: Telefonaktiebolaget L M Ericsson (publ.), Stockholm, Sweden

[21] Appl. No.: 541,130

[22] Filed: Oct. 10, 1995

[51] Int. Cl.[6] ............................. H04Q 7/00; H04M 11/00
[52] U.S. Cl. ................................. 340/825.44; 340/825.22; 455/67.7; 455/68; 348/552; 348/729; 379/56.1
[58] Field of Search ........................ 340/825.44, 825.31, 340/825.34, 825.22; 379/56, 57, 58; 348/552, 729; 455/67.7, 68

[56] References Cited

U.S. PATENT DOCUMENTS

| | | | |
|---|---|---|---|
| 4,107,473 | 8/1978 | Pierce et al. | 179/18 BF |
| 4,408,099 | 10/1983 | Ishii | 179/2 EC |
| 4,661,972 | 4/1987 | Kai | 379/57 |
| 4,910,510 | 3/1990 | Davis et al. | 340/825.44 |
| 4,916,441 | 4/1990 | Gombrich | 340/712 |
| 4,928,096 | 5/1990 | Leonardo et al. | 340/825.44 |
| 5,043,721 | 8/1991 | May | 340/825.44 |
| 5,128,980 | 7/1992 | Choi | 379/56 |
| 5,138,312 | 8/1992 | Tsukamoto et al. | 340/825.44 |
| 5,148,469 | 9/1992 | Price | 379/57 |
| 5,153,582 | 10/1992 | Davis | 340/825.44 |
| 5,252,964 | 10/1993 | Tan et al. | 340/825.48 |
| 5,272,324 | 12/1993 | Blevins | 235/462 |
| 5,331,136 | 7/1994 | Koenck et al. | 235/375 |
| 5,337,044 | 8/1994 | Folger et al. | 340/825.44 |

FOREIGN PATENT DOCUMENTS

| | | |
|---|---|---|
| 0 627 824 A1 | 7/1994 | European Pat. Off. . |
| 2 626 731 | 12/1988 | France . |
| 0 444 479 A3 | 8/1992 | Germany . |
| 2 249 459 | 6/1992 | United Kingdom . |
| 2 256 113 | 11/1992 | United Kingdom . |
| WO 90/00297 | 1/1990 | WIPO . |
| WO 90/14646 | 11/1990 | WIPO . |

OTHER PUBLICATIONS

Hui et al., *Telephone with Bar–Code Reader Capability Feature*, Motorola Technical Developments, vol. 20, Oct. 1993, Schaumburg, Illinois, pp. 115–117.

*Two–Way IR SCI Through Pager Housing Or CD*, George William McClurg, Motorola, Inc., Technical Developments, vol. 16, pp. 20–21, Aug. 1992.

*Using An Infrared Sensor To Program Pagers*, Christopher R. Long, Motorola, Inc., Technical Developments, vol. 16, pp. 61–62, Aug. 1992.

*Primary Examiner*—Michael Horabik
*Assistant Examiner*—Yonel Beaulieu
*Attorney, Agent, or Firm*—Jenkens & Gilchrist, P.C.

[57] ABSTRACT

Remote access circuitry and an associated method for a pager permits remote access to a pager from a source other than a network paging terminal. Human-perceptible signals are provided to the remote access circuitry by way of a mass-market communication medium. Signals applied to the remote access circuitry permit reconfiguration of the pager, as desired, or display of messages at the pager. An external service provider generating signals from a source other than the network paging terminal of a paging system are able to reconfigure, or display messages at, the pager.

37 Claims, 4 Drawing Sheets

CIRCUITRY AND METHOD FOR ACCESSING A RADIO PAGER

The present invention relates generally to a pager operable at least to receive a radio frequency paging signal transmitted to the pager by a paging terminal of a paging system. More particularly, the present invention relates to pager circuitry, and an associated method, for permitting an external service provider to access a pager. By permitting the external service provider to access the pager, the external service provider can reconfigure the pager, alter the "features" of the pager, and cause messages to be displayed on the pager.

BACKGROUND OF THE INVENTION

Paging systems have achieved wide usage throughout many areas of the world. A paging system provides an inexpensive manner by which communication can be effectuated to a receiving party. Geographic areas are oftentimes encompassed by several different paging systems. A consumer of paging services can oftentimes, therefore, select service amongst the different paging systems and subscribe to a desired one of the paging systems.

To be operable in a paging system, a pager typically must be programmed with data to "configure" the pager to the paging system in which the pager is to be operable. Such data is sometimes referred to as "configuration data." The configuration data defines software algorithms executable by a processor of the receiving circuitry of the pager during operation of the pager to receive the paging signals. The configuration data defining the software algorithms must permit operation of the pager in the paging system to which the consumer subscribes.

An N-PCS "acknowledgment" pager, or another type of "two-way" pager, further includes transmitter circuitry to permit the subscriber to respond to a paging signal transmitted to the pager. A processor forming a portion of the transmitter circuitry executes software algorithms defined by configuration data programmed into the pager.

Different paging systems have different signaling schemes and formats. A pager configured to be operable in one of the paging systems might not be, and is typically not, operable in another of the paging systems. If a consumer subscribing to one paging system desires to subscribe instead to a different paging system, the pager, initially configured to the operable in a first of the paging systems, must be reconfigured to be operable in the subsequently-selected paging system.

A paging system sometimes has different levels of service or "features." By subscribing at a particular service level, certain features of the pager are activated. When a subscriber to a paging system desires to upgrade the subscription to include the additional features, a reconfiguration of portions of the data stored at the pager is again necessitated. Such data associated with selectable features shall, at times, herein be referred to as the "personalizing" characteristics of the pager.

In some paging systems, reconfiguration of the data stored at a pager requires the subscriber to deliver the pager to servicing personnel. The servicing personnel effectuate the reconfiguration of the data of the pager.

Some other paging systems provide for a remote reconfiguration of the data of the pager. In such systems, paging signals generated by the network paging terminal are transmitted to the pager, and control commands contained in the paging signal instruct the pager to reconfigure appropriate portions of the data stored at the pager. A pager operable in such a system includes, for instance, two separate memories, a first of which to store temporarily the reconfiguration data transmitted to the pager by the paging terminal and a second memory element for permanently storing the data. Once stored in the first memory element, the processing circuitry causes transfer of the received data to the second memory element to overwrite the configuration data stored therein with the newly-received data.

Such paging systems permit a network service provider to reconfigure the configuration characteristics and the personalizing characteristics of selected pagers in addition to conventional transmission of informational data to the pager.

External service providers, that is, paging service providers other than the network service provider, must typically pay fees to access a pager by way of a paging network. Such fees might be cost-prohibitive to the external service provider. Therefore, an external service provider might not have the same access to the paging terminal of the paging system and might not have the same ability to reconfigure the pager or otherwise to access the pager.

A manner by which to permit an external service provider to access a pager would therefore be advantageous. Such remote accessing would permit the external service provider to reconfigure the configuration data or the personalizing characteristics of the pager. Such remote accessing would further permit the external service provider to provide informational messages to the pager to be displayed by the pager. If the pager is a two-way pager, the subscriber can be prompted to respond in conventional fashion to the message transmitted by the external service provider to the pager. Remote access to larger numbers of pagers would also be a powerful marketing tool as informational messages could be sent to large numbers of pagers without requiring access to a paging network.

It is in light of this background information related to pagers and pager systems that the significant improvements of the present invention have evolved.

SUMMARY OF THE INVENTION

In one aspect of the present invention, a pager includes remote access circuitry for receiving an access signal formed by a source other than a network terminal of a paging system. The access signal is formed of an audio signal, such as a DTMF signal transmitted upon a telephonic network and received by conventional, telephonic apparatus. An audio transducer of the remote access circuitry detects the audio signal and converts the audio signal into an electrical signal of values representative of values of the audio signal. The electrical signal is applied to a control device which generates commands responsive to values of the electrical signal. When the audio signal detected by the audio transducer is of a selected value, the control device causes reconfiguration of the configuration data stored at the pager. When the audio signal detected by the audio transducer is of another selected value, the control device generates commands to cause reprogramming of data pertaining to the personalizing characteristics of the pager. And, when the audio signal detected by the audio transducer is of a third selected value, the control device generates commands to cause display of an informational message by the pager.

In another aspect of the present invention, remote access circuitry receives an optical signal formed by a source other than the network terminal of a paging system. An optical transducer detects the optical signal and converts the optical signal into an electrical signal of values representative of the values of the optical signal. A control device is coupled to receive the electrical signal for generating commands responsive to values of the electrical signal. When the optical signal is of a first, selected value, the control device generates commands to cause reconfiguration of the configuration characteristics of the pager. When the optical signal detected by the optical transducer is of a second, selected value, the control device generates commands to cause reconfiguring of data pertaining to the personalizing characteristics of the pager. And, when the optical signal detected by the optical transducer is of a third, selected value, the control device generates commands to cause display at the pager of an informational message.

In yet another aspect of the present invention, a pager includes remote access circuitry in addition to network paging signal receiver circuitry. The network paging signal receiver circuitry is operative to receive a paging signal transmitted thereto by a network paging terminal. The remote access circuitry is operative to receive an access signal formed by a source other than the network paging terminal. An access signal transducer senses the access signal and converts the access signal, when sensed, into an electrical signal of values representative of the values of the access signal. A control device is coupled to receive the electrical signal formed by the access signal transducer. The control device generates commands responsive to the interpreted values of the electrical signal.

In still another aspect of the present invention, the pager forms at two-way pager. The two-way pager includes transmitter circuitry in addition to remote access circuitry and network paging signal receiving circuitry. The remote access signal circuitry is operative to receive an access signal formed by a source other than the network paging terminal. An access signal transducer senses the access signal and converts the access signal into an electrical signal of values representative of values of the access signal. A control device is coupled to receive the electrical signal formed by the access signal transducer. The control device generates commands to cause display at the pager of a message which prompts a response to be transmitted to a network paging terminal.

An object of the present invention, accordingly, is to provide a manner by which signals generated at a source other than a network paging terminal of a paging system can be applied to a pager.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
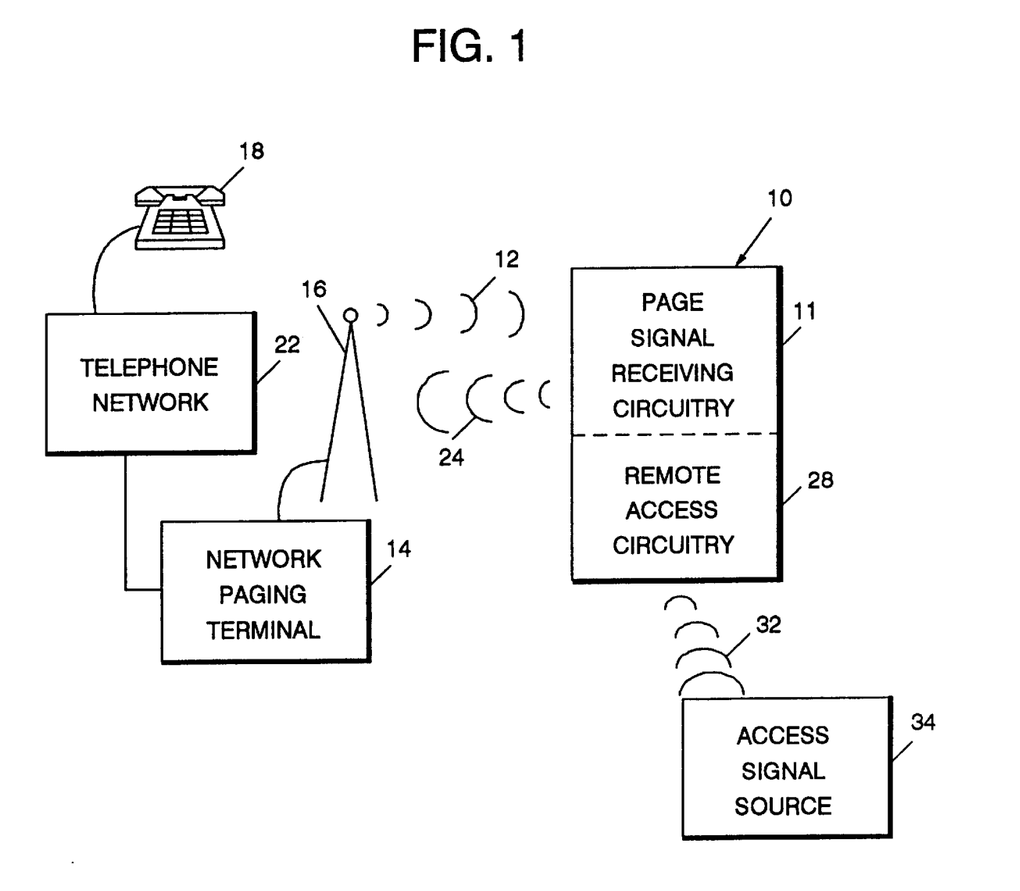
FIG. 1 is a block diagram of a pager of an embodiment of the present invention positioned to receive paging signals generated by a paging network terminal of a paging system and also to receive an access signal generated by an access signal source.

Referring first to FIG. 1, a pager 10 of an embodiment of the present invention is operable in conventional manner in a paging system and includes page signal receiving circuitry 11 to receive paging signals 12 generated by a network paging terminal 14 and transmitted by way of a transmitter 16.

In conventional fashion, initiation of the paging signal 12 is made by way of a telephonic request. Such a request is entered, for instance, by a caller positioned at telephonic apparatus 18. The caller at the telephonic apparatus 18 places a call by way of a telephonic network 22 to the network paging terminal 14. In conventional fashion, in response to the call placed to the paging terminal, the network paging terminal 14 generates the paging signal 12 which is transmitted by way of the transmitter 16 to the pager 10. Upon receipt of the paging signal 12 by the page signal receiving circuitry 11, the pager 10 displays the informational content of the paging signal.

In the embodiment illustrated in the figure, the pager 10 forms an acknowledgment pager, such as the pager operable in an N-PCS system. In such an embodiment, the pager 10 is further operable to generate an acknowledgment response signal 24 which is transmitted back to the network paging terminal 14. The acknowledgment response signal 24 can be transmitted, for instance, to acknowledge receipt of the paging signal 12. As is conventional of two-way pagers, the pager 10 also includes an input element (not shown) for permitting a subscriber carrying the pager 10 to select a value of the acknowledgment signal 24 transmitted back to the terminal 14.

As mentioned previously, the pager 10 must be configured in a manner to permit reception of the paging signal 12 generated by a particular paging system. A pager 10 configured for operation in one paging system is typically not operable in another paging system. When a subscriber to a paging system desires instead to subscribe to another paging system, the pager 10 must be reconfigured to permit operation in the other paging system.

Some paging systems and pagers permit remote reconfiguration of the configuration characteristics of the pager, thereby to reconfigure the pager. Remote reconfiguration is advantageous as the subscriber is not required to return the pager to a support or repair facility to have the pager reprogrammed. The reconfiguration is effectuated by the transmission of appropriate radio frequency paging signals 12 to command the pager to reconfigure itself and to provide the pager with new configuration data defining the new control characteristics. In a similar manner, "feature" upgrades and other alterations altering the personalizing characteristics of the pager can similarly be effectuated. While reconfiguration of the characteristics of the pager can be effectuated by a network service provider, a non-network, or external, service provider is unable similarly to effectuate remote reconfiguration of the pager.

To permit an external service provider to reconfigure the pager 10, the pager is further provided with remote access circuitry 28 which forms a portion of the pager. The remote access circuitry 28 is capable of receiving access signals 32 generated by an access signal source 34.

In one embodiment of the present invention, the access signals are formed of audio signals and the remote access circuitry 28 includes an audio transducer, such as a microphone, for receiving the audio signals. In another embodiment of the present invention, the access signal is formed of an optical signal, and the remote access circuitry includes an optical transducer for receiving the optical signal forming the access signal.

Through proper utilization of the access signal source 34, an external service provider can provide signals to the pager 10 by way of a mass-market communication medium to cause reconfiguration of the pager 10. Reconfiguration either of the control characteristics of the pager or of the personalizing characteristics of the pager 10 is possible. In addition to the ability to reconfigure the pager, signals generated by the access signal source 34 may also form informational signals for display at the pager 10. When the pager 10 forms a two-way pager, the signals displayed at the pager prompt the subscriber to respond to the message formed of the displayed signal. The response is transmitted to the network paging terminal. The response may be selected from amongst a predefined list of replies stored at the pager or the message transmitted to the pager may include a list of alternative replies as a portion of the transmitted message.

Figure 2:
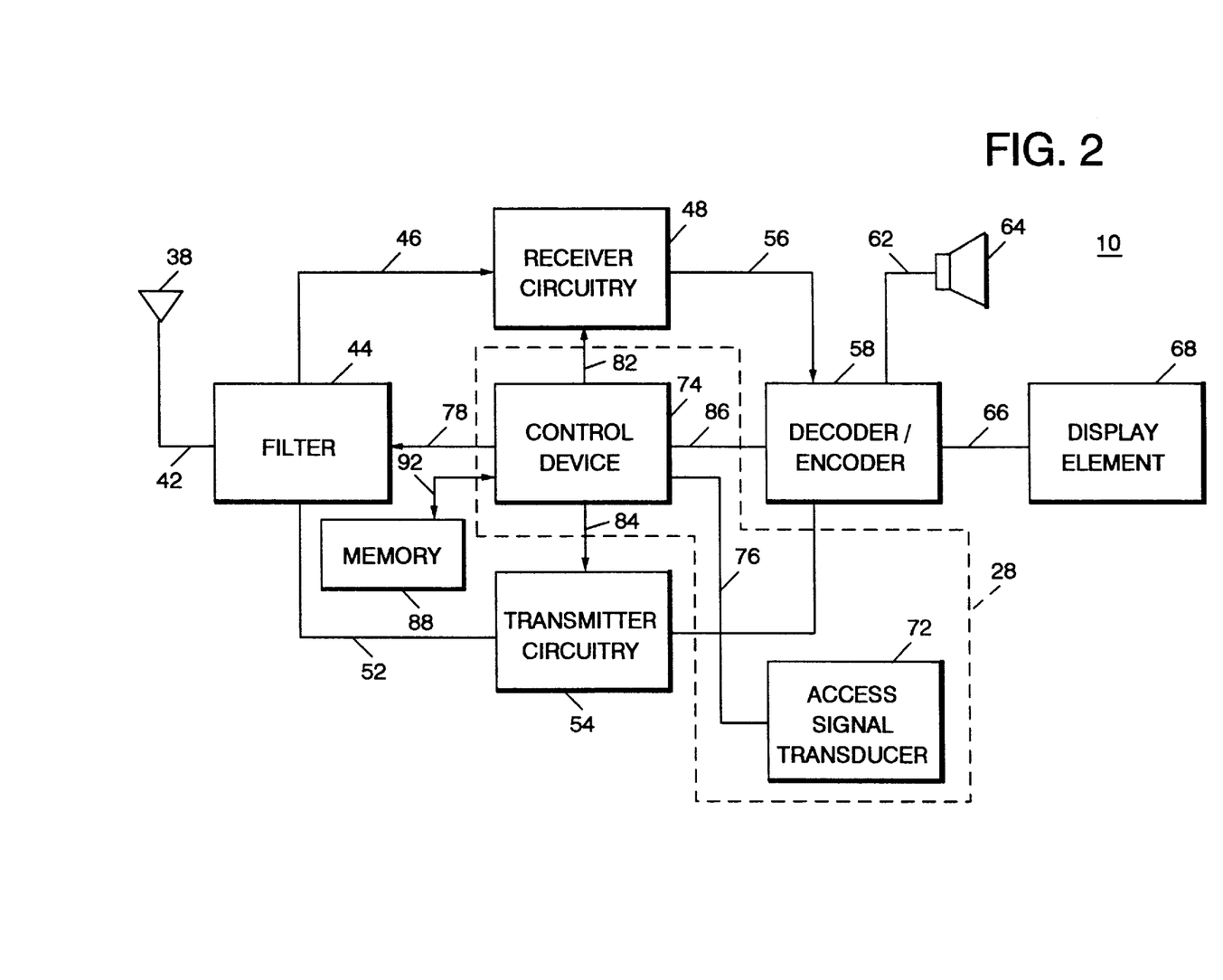
FIG. 2 is a functional block diagram of the radio pager of an embodiment of the present invention.

FIG. 2 illustrates the pager 10 in greater detail. In the embodiment illustrated in FIG. 2, the pager 10 forms a two-way or acknowledgment pager, such as an N-PCS pager. Other types of pagers may similarly be constructed according to the teachings of the present invention.

The pager 10 includes an antenna 38 for receiving paging signals, such as the paging signal 12 shown in FIG. 1. The antenna 38 converts the radio frequency signal received at the antenna 38 into an electrical signal on line 42 which is coupled to an antenna receiver/transmitter filter 44. The filter couples the line 42 to line 46 which extends to receiver circuitry 48. The filter 44 also connects the line 42 with line 52 extending to transmitter circuitry 54.

When signals are transmitted to the pager, paging signals received by the antenna 38 are converted into electrical signals, and such electrical signals are applied to the receiver circuitry 48. The receiver circuitry demodulates the received signal and generates a baseband signal on line 56 which is applied to decoder-encoder circuitry 58. The circuitry 58 decodes the baseband signal applied thereto and generates an annunciation signal on line 62 which is applied to an annunciator 64, here a speaker. Thereafter, decoded signals generated on the line 66 are displayed upon a display element 68, in conventional manner.

The antenna 38, filter 44, receiver circuitry 48, decoder/encoder 58 and annunciator 64 together form the page signal receiving circuitry 11, shown in FIG. 1.

The remote access circuitry 28 is again illustrated to form a portion of the pager 10. The remote access circuitry 28 includes an access signal transducer 72 and a control device 74. Access signals 32 (shown in FIG. 1) generated by the access signal source 34 (also shown in FIG. 1) are detected by the access signal transducer 72 and are converted into an electrical signal on the line 76 which is coupled to the control device 74.

The control device 74 interprets the values of the signals applied thereto on the line 76 and effectuates control functions responsive to the values of the signal applied thereto on the line 76. While the control device 74 is illustrated to form a portion of the remote access circuitry 28, the control device 74 is additionally operative to control operation of other elements of the pager 10.

For instance, signals generated by the control device 74 on the line 78 extending to the antenna switch 44 control the switch position of the antenna switch. Signals generated on the lines 82 and 84 control operation of the receiver and transmitter circuitry 48 and 54, respectively. And, signals generated on the line 86 extending to the decoder/encoder 58 control operation of the decoder/encoder.

The pager 10 further includes a memory element 88. The memory element 88 is formed of a programmable memory and is coupled to the control device 74 by way of line 92. The memory element 88 includes memory locations permitting the storage of data forming algorithms which, when accessed by processing circuitry of the control device, are executed to effectuate operation of the pager 10. The data stored in the memory element 88, for instance, stores the data defining the configuration characteristics and the personalizing characteristics of the pager. The configuration characteristics permit the operation of the pager 10 in a particular paging system. The personalizing characteristics define the features which are accessible by the pager.

The features are system "add-ons" which provide additional functionality to the pager in addition to the basic functions of the pager provided by way of a basic subscription by a subscriber to the paging system.

As also noted previously, a pager configured to have configuration characteristics operable in one paging system must be reconfigured to be operable in another paging system. Also, when a subscriber desires to subscribe to additional, or alternate, features of a paging system, the personalizing characteristics of the pager must be reconfigured to permit the pager to access the additional features.

While some conventional pagers can be reconfigured remotely by way of transmission of appropriate radio paging signals transmitted to the pager by a network paging terminal, an external service provider is typically unable similarly to access the network paging terminal. To access the network paging terminal, the external service provider must typically pay access fees to the network service provider. The external service provider is therefore unable to effectuate the remote reconfiguration of a pager in conventional fashion.

By use of the remote access circuitry 28 of an embodiment of the present invention, an external service provider can effectuate reconfiguration of a pager by way of appropriate utilization of an access signal source, such as the source 34 shown in FIG. 1. The access signal source 34 can be utilized not only to reconfigure a pager but also to transmit informational data to the pager to be displayed at the pager. Informational data transmitted to the pager 10 forming a two-way pager, can be used to prompt the subscriber of the paging services to initiate a response, transmitted back to the network paging terminal 14 (shown in FIG. 1) in conventional manner. A list of predefined replies can be stored at the pager, e.g., in the memory 88 or the list of alternative replies can form a portion of the transmitted message, in conventional fashion.

FIG. 3 again illustrates the pager 10, here positioned to receive an access signal 32 formed of an audio signal. The access signal source 34 which generates the audio signals 32 is formed of a DTMF signal generator 102 which can be transmitted by way of a telephonic network 104 to be received by telephonic apparatus 106 having a telephonic handset 108. The speaker portion of the telephonic handset 108 generates audio signals of tones defined by the DTMF signal generator 102.

Figure 3:
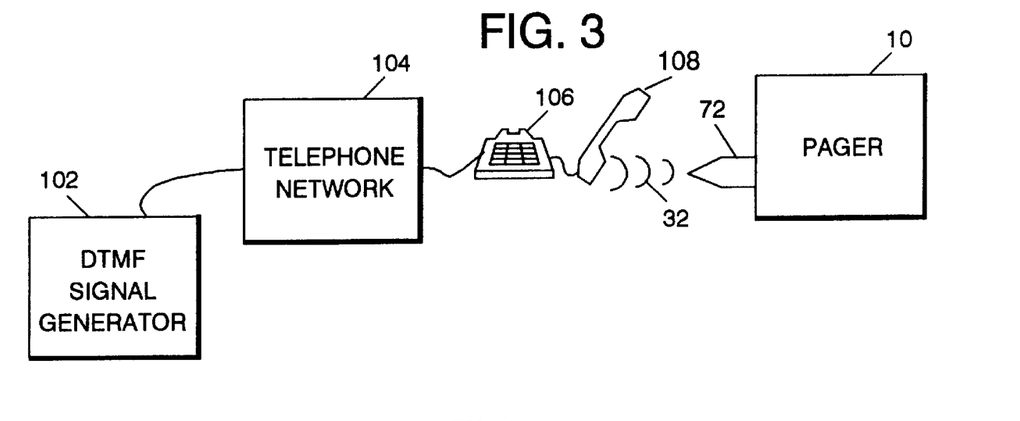
FIG. 3 is a diagram illustrating positioning of a pager to receive an access signal formed of a DTMF signal transmitted by way of a telephonic network.

The access signal transducer 72 of the pager 10 is formed of an audio transducer capable of detecting the DTMF signals output by the speaker portion of the telephonic handset. By appropriate selection of the values of the DTMF signal generated by the generator 102 and transmitted by way of the telephonic network 104, the pager 10 can be reconfigured, as desired. Additionally, DTMF signals can be utilized to cause generation of messages for display upon the display element of the pager 10. Again, when the pager forms a two-way pager, the subscriber of the paging services can be prompted to respond to the received message.

Because the DTMF signals can be generated remotely and transmitted upon a conventional, telephonic network, reconfiguration of a pager can be effectuated merely by generation of the appropriate DTMF signals from almost any location connectable to the telephonic network 104.

For instance, sales personnel for an external service provider can reconfigure the pager, either with new configuration characteristics or new personalizing characteristics by way of the telephonic network.

As a conventional, telephonic network 104 and telephonic apparatus 106 connected to the network 104 are utilized, no additional special hardware is required to effectuate the reconfiguring of the pager 10. Any pager 10 having the remote access circuitry 28 of an embodiment of the present invention capable of detecting DTMF signals can be reconfigured in such manner. Additionally, informational messages can be transmitted to the pager 10 in the same manner. Again, when the pager forms a two-way pager, the subscriber of the paging services can be prompted to respond to the received message.

Figure 4:
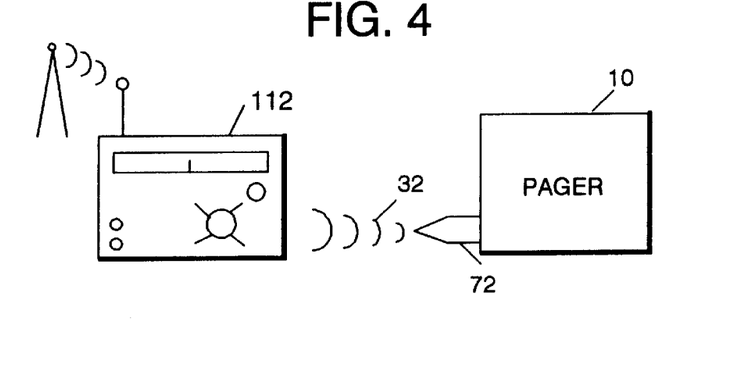
FIG. 4 is a diagram illustrating a pager of an embodiment of the present invention positioned to receive an access signal formed of an audio signal generated by a radio receiver.

FIG. 4 illustrates a pager 10 including remote access circuitry 28 of another embodiment of the present invention. In this embodiment, the remote access circuitry includes an audio transducer capable of receiving access signals 32 formed of audio signals generated by a radio receiver 112. Radio frequency signals generated by a radio transmitter, such as the signals generated by a commercial, radio broadcasting facility, are transmitted to the radio receiver 112. The audio signals formed responsive thereto are applied to the acoustic transducer forming the access signal transducer 72 of the remote access circuitry 28.

Reconfiguration of the pager 10 and display of messages at the pager can once again be effectuated. An external service provider can purchase transmission time from the commercial, radio broadcaster to transmit signals which cause formation of the access signals 32 applied to the remote access circuitry 28 of the pager 10. The access signals 32 may be hidden, or camouflaged, within an otherwise-normal commercial broadcast by way of a commercial, radio station. The access signals 32 may, if so desired, instead form a portion of a "jingle" of the commercial.

For instance, during the commercial, the subscribers may be instructed to place the pager 10 close to the speaker of the radio receiver 112, and thereafter the access signals 32 can be transmitted to the pager 10 to cause appropriate reconfiguration or display of particular messages upon the display element of the pager. When the pager forms a two-way pager, the displayed message can be used to prompt a response to be transmitted to a network paging terminal.

Figure 5:
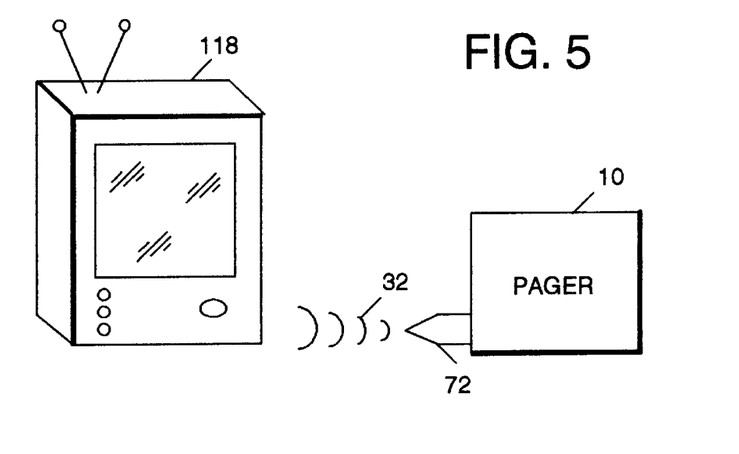
FIG. 5 is a diagram illustrating a pager of an embodiment of the present invention positioned to receive an access signal formed by an optical signal generated upon a television screen.

FIG. 5 illustrates a pager 10 including remote access circuitry 28 which again includes an access signal transducer formed of an acoustic transducer. In this embodiment, the access signals 32 are formed of the audio portion of a television signal transmitted by a television transmitter to a television receiver 118.

In a manner analogous to transmission of radio frequency signals to the radio signals 112, a television transmitter generates television signals which are transmitted to the television receiver 118. The audio portion of the television signal causes generation of the signals 32 which are detected by the acoustic transducer 72 of the remote access circuitry 28.

By appropriate selection of the signals transmitted by the television transmitter, the audio portion of the television signal, responsive to reception by the acoustic transducer of the remote access circuitry 28, can cause effectuation of reconfiguring of the pager. Additionally, appropriate selection of the audio portion of the television signal can cause the pager to display messages on the display element of the pager. Again, when the pager forms a two-way pager, the subscriber of the paging services can be prompted to respond to the received message.

Figure 6:
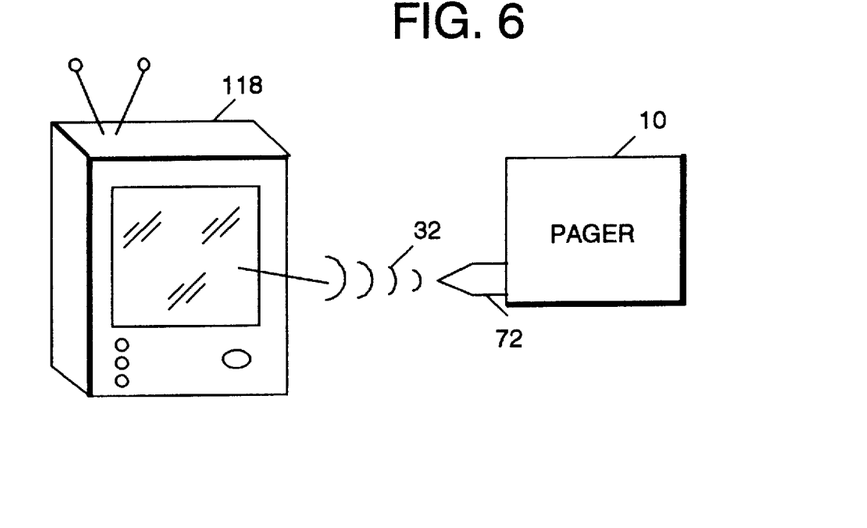
FIG. 6 is a diagram of a pager of an embodiment of the present invention having an audio transducer positioned to receive an access signal formed of a portion of a television signal received at a television set.

FIG. 6 illustrates a pager including remote access circuitry 28 of another embodiment of the present invention. The pager 10 is again positioned to receive access signals 32 transmitted by way of an access signal source 34. In this embodiment, the access signals are formed of video signals, here the video signals formed of the video portion of a television signal transmitted by a television transmitter. The access signal transducer 72 is formed of an optical transducer for converting optical signals into the electrical signals.

By transmission of appropriate television signals, the video portion of the television signal received and displayed by the television receiver 118 causes reconfiguration, as desired, of the pager 10. Also, by appropriate selection of the video portion of the television signal, the pager can be caused to display a message on the display element of the pager. The displayed message can prompt a subscriber of the paging services to respond to the message when the pager is formed of a two-way pager.

The external service provider may, for example, purchase commercial time on a commercial, television station. Portions of the video portion of the television signal transmitted during the commercial time causes generation of the video signals 32 to cause reconfiguration, as desired, of the pager or display of messages at the pager. Again, the video signals can be hidden or camouflaged within other video images or the subscribers can be instructed to place the pager to receive portions of the video signal. The pager can be reconfigured where messages can be caused to be displayed upon the pager without the need to access the network paging terminal of a paging system. The message can further prompt a subscriber of the paging services to respond to the message when the pager is formed of a two-way pager.

Figure 7:
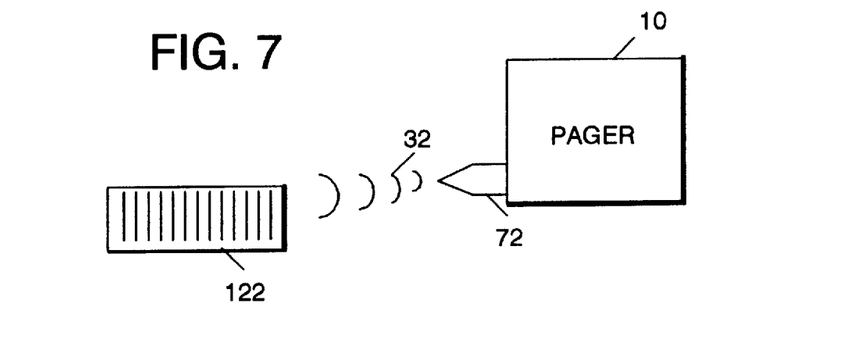
FIG. 7 is a diagram illustrating a pager of an embodiment of the present invention having an optical scanner positioned to read an access signal formed by a bar code.

FIG. 7 illustrates the pager 10 which includes remote access circuitry 28 of another embodiment of the present invention. The pager 10 again includes remote access circuitry 28. In this embodiment, the access signal transducer 72 is formed of an optical code reader capable of reading a bar code, here bar code 122. By placing the bar code reader forming a transducer 72 proximate to an appropriately-coded bar code, the pager 10 can be reconfigured, as desired, or can be caused to display a message on the display element thereof. Again, when the pager forms a two-way pager, the subscriber of the paging services can be prompted to respond to the received message.

In this embodiment, the optical image formed of the bar code 122 form the access signals 32 which are detected by the bar code reader forming the transducer 72. To reconfigure the pager to be operable in a new paging system, for instance, a new service provider may provide an appropriately-coded bar code to a prospective subscriber. The bar code may, for instance, be formed upon promotional literature of a mass-mailing commercial campaign. The prospective subscriber can be instructed to position the pager 10 including the transducer 72 formed of the bar code reader proximate to the bar code. By reading the bar code, the pager is caused to be reconfigured, as desired. Also, by appropriate coding of the bar code, the pager can be caused to display messages, and such messages can also be utilized for advertising purposes. Reconfiguration of the pager or display of messages at the pager can be effectuated without accessing the network paging terminal of a paging system.

Figure 8:
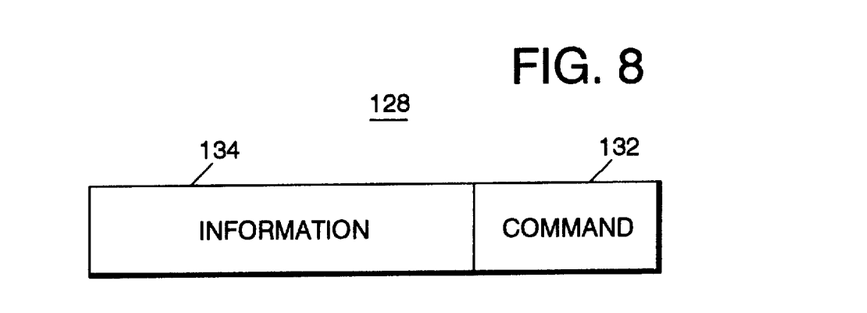
FIG. 8 is a diagram illustrating a signaling format of an embodiment of the present invention.

FIG. 8 illustrates an exemplary data signal 128 of which an access signal 32 utilized in any of the above-described embodiments of the present invention may be formed. The signal 128 includes a command portion 132 and an informational portion 134. When the command portion 132 of the access signal is detected by an access signal transducer and interpreted by the control devices 74 (FIG. 2), control commands are generated by the control device responsive to values of the command portion 132.

When the command portion 132 is of a particular value, the control device effectuates display of the informational portion 134 on the display element 68 (FIG. 2) of the pager 10. When the command portion 132 is of other selected values, the control device effectuates reconfiguration of either configuration characteristics or personalizing characteristics of the pager.

Because the remote access circuitry 28 and a pager 10 incorporating such circuitry permits reconfiguration of the pager or display of messages on the display element 68 of the pager without utilization of the network paging terminal, external service providers can effectuate reconfiguration and display of transmitted messages conveniently and inexpensively. A pager operative in one paging system can be reconfigured to be operative in another paging system, operational features of the pagers can be added or deleted, and messages can be displayed at the pager, all without accessing the network paging terminal. Messages sent to a two-way pager by an external service provider can be used to prompt the subscriber of the paging services to respond to the message.

Additionally, a subscriber having a pager operable in a first paging system can subscribe remotely to an alternate paging system through operation of the present invention. The alternate service provider can cause reconfiguration of the pager by acting as the external service provider to cause an access signal source to reconfigure the pager. Once reconfigured, the pager is operable in the alternate paging system.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed:

1. In a pager having network paging signal receiver circuitry for receiving a paging signal transmitted thereto by a network paging terminal, an improvement of access signal receiving circuitry for receiving a perceptible access signal formed at a source other than the network terminal and provided to said access signal receiving circuitry by way of a mass-market communication medium, the perceptible access signal formed of at least a selected one of an audio signal and an optical signal, the selected one of the audio signal and the optical signal of characteristics permitting perception thereof during transmission of the perceptible access signal to the pager, said access signal receiving circuitry comprising:

an access signal transducer for sensing the perceptible access signal, said access signal transducer further for converting the perceptible access signal, when sensed, into an electrical signal of values representative of values of the perceptible access signal; and a control device coupled to receive the electrical signal formed by said access signal transducer, the control device for generating control commands for controlling operation of selected functions of the pager responsive to values of the electrical signal.

2. The access signal receiving circuitry of claim 1 wherein the pager includes a display device, wherein the perceptible access signal comprises an informational message, and wherein said control device causes display of the informational message formed of the perceptible access signal on said display device.

3. The access signal receiving circuitry of claim 1 wherein the pager includes a programmable memory element for storing personalizing characteristics of the pager, wherein the perceptible access signal comprises pager characteristic data for reprogramming the personalizing characteristics of the pager, and wherein said control device causes reprogramming of the personalizing characteristics data stored in the memory element with the pager characteristic data formed of the access signal.

4. The access signal receiving circuitry of claim 1 wherein the pager includes a programmable memory element for storing pager configuration data, wherein the perceptible access signal comprises pager configuration data for reconfiguring the pager configuration data stored in the pager, and wherein said control device causes reconfiguring of the pager configuration data stored in the memory element with the pager configuration data formed of the perceptible access signal.

5. The access signal receiving circuitry of claim 1 wherein the perceptible access signal comprises an audio signal and wherein the access signal transducer comprises an acoustic transducer for converting the audio signal forming the perceptible access signal into the electrical signal.

6. The access signal receiving circuitry of claim 5 wherein the audio signal forming the perceptible access signal comprises a DTMF signal and wherein the said acoustic transducer forming said access signal transducer converts the DTMF signal into the electrical signal, the electrical signal of values representative of values of the DTMF signal.

7. The access signal receiving circuitry of claim 6 wherein the DTMF signal is transmitted upon a telephonic network and received by telephonic apparatus and wherein said acoustic transducer is positionable to detect the DTMF signal received by the telephonic apparatus.

8. The access signal receiving circuitry of claim 5 wherein the audio signal forming the access signal comprises an audio portion of a television signal received by a television and wherein said acoustic transducer is positionable to detect the audio portion of the television signal.

9. The access signal receiving circuitry of claim 5 wherein the audio signal forming the access signal comprises a radio signal transmitted to a radio receiver and wherein said acoustic transducer is positionable to detect the radio signal received by the radio receiver.

10. The access signal receiving circuitry of claim 1 wherein the perceptible access signal comprises an optical signal and wherein the access signal transducer comprises an optical transducer for converting the optical signal forming the perceptible access signal into the electrical signal.

11. The access signal receiving circuitry of claim 10 wherein the optical signal forming the access signal is formed by a bar code and wherein said optical transducer forming said signal transducer converts the optical signal formed by the bar code into the electrical signal.

12. The access signal receiving circuitry of claim 11 wherein said optical transducer comprises a bar code reader positionable proximate to the bar code.

13. The access signal receiving circuitry of claim 10 wherein the optical signal forming the access signal comprises an optical portion of a television signal transmitted to a television and wherein said optical transducer is positionable to detect the optical portion of the television signal received by the television.

14. The access signal receiving circuitry of claim 1 wherein the pager comprises a two-way pager having transmitter circuitry, and wherein said control device is further operative to cause the transmitter to transmit a transmit signal.

15. The access signal receiving circuitry of claim 14 wherein the access signal comprises an informational message including a prompt for a transmit signal to be transmitted to the network terminal.

16. The access signal receiving circuitry of claim 15 wherein the informational message includes a list of alternative replies, the transmit signal formed of a selected one of the alternative replies.

17. The access signal receiving circuitry of claim 15 wherein a list of replies is stored at the pager and transmit signal is formed of a selected reply of the list of replies.

18. In a pager having network paging signal receiver circuitry for receiving a paging signal transmitted thereto by network paging terminal, an improvement of access signal receiving circuitry for receiving a perceptible access signal formed by a source other than the network terminal and provided to said access signal receiving circuitry by way of a mass-market communication medium, the perceptible access signal formed of at least a selected one of an audio signal and an optical signal, the selected one of the audio signal and the optical signal of characteristics permitting perception thereof during transmission of the perceptible access signal to the pager, said access signal receiving circuitry comprising:

means for sensing the access signal, said means for sensing further for converting the access signal, once sensed, into an electrical signal of values representative of values of the access signal; and means, coupled to receive the electrical signal formed by said means for sensing, for interpreting the values of the electrical signal and for generating commands responsive to the interpreted values of the electrical signal.

19. A method for providing a pager with a perceptible access signal, the perceptible access signal formed of at least a selected one of an audio signal and an optical signal, the selected one of the audio signal and the optical signal of characteristics permitting perception thereof, the pager operative in a paging system to receive a paging signal transmitted to the pager by a paging terminal, said method comprising the steps of:

forming the perceptible access signal at an access signal source other than the paging terminal;

providing the perceptible access signal formed during said step of forming by way of a mass-market communication medium to an access signal transducer positioned at, and forming a portion of, the pager, the perceptible access signal permitting perception of the perceptible access signal as the perceptible access signal is provided to the pager;

converting the access signal applied to the access signal transducer during said step of providing into an electrical signal; and generating control commands for controlling selected operations of the pager responsive to values of the electrical signal.

20. The method of claim 19 wherein the perceptible access signal formed during said step of forming comprises a DTMF signal, and wherein said step of providing comprises transmitting the DTMF signal upon a telephonic network to select a telephonic apparatus and positioning the access signal transducer proximate to the telephonic apparatus to detect the DTMF signal transmitted thereto.

21. The method of claim 19 wherein the access signal formed during said step of forming comprises an audio portion of a television signal, and wherein said step of providing comprises the steps of transmitting the television signal to a television receiver and positioning the access signal transducer proximate to the television receiver to detect the audio portion of the television signal transmitted to the television receiver.

22. The method of claim 19 wherein the perceptible access signal comprises a radio signal, and wherein said step of providing comprises the steps of transmitting the radio signal to a radio receiver and positioning the access signal transducer proximate to the radio receiver to detect the radio signal transmitted to the radio receiver.

23. The method of claim 19 wherein the perceptible access signal is formed of an optical portion of a television signal, and wherein said step of providing comprises transmitting the television signal to a television receiver and positioning the access signal transducer proximate to the television receiver to detect the optical portion of the optical signal transmitted thereto.

24. The method of claim 19 wherein the access signal formed during said step of forming comprises a bar code printed upon a print medium, and wherein said step of providing comprises the steps of positioning the access signal transducer proximate to the bar code and reading the bar code.

25. A pager comprising:

a paging network signal receiver for receiving a paging signal transmitted by a network paging terminal;

an access signal receiver coupled to the paging network signal receiver for receiving an access signal including a selected one of a coded audio signal and a coded optical signal, said access signal is transmitted from a source other than the network paging terminal;

said access signal receiver including a signal transducer for sensing the access signal and for converting the access signal into an electrical signal of values representative of values of the access signal, a controller for receiving said electrical signal and for generating control commands in response to the values of the electrical signal; and said control commands including a selected one of a reprogramming command for reprogramming the pager and an informational command for displaying an informational message included in said access signal.

26. The pager in accordance with claim 25, further comprising a programmable memory element coupled to the controller for storing reconfiguration data associated with the reprogramming command.

27. The pager in accordance with claim 25, further comprising a programmable memory element coupled to the controller for storing personalizing characteristics data associated with the informational command.

28. The pager in accordance with claim 25, wherein said access signal receiver comprises an audio signal receiver for reception of said coded audio signal configured as DTMF signals.

29. The pager in accordance with claim 28, wherein said coded audio signal is broadcasted over a mass communication network.

30. The pager in accordance with claim 28, wherein said coded audio signal is transmitted over a public switched telephone network.

31. The pager in accordance with claim 25, wherein said access signal receiver comprises an optical signal receiver for reception of said coded optical signal.

32. The pager in accordance with claim 31, wherein the coded optical signal is broadcasted over a television network.

33. The pager in accordance with claim 31, wherein the coded optical signal includes a bar code signal.

34. A method of accessing a pager with an access signal formed at a source other than a paging network, where said access signal comprises a selected one of a coded audio signal and a coded optical signal, said method comprising the steps of:

receiving said access signal broadcasted in a selected one of a radio network and a television network; and converting said received access signal into an electrical signal of values representative of values of the access signal.

35. The method in accordance with claim 34, further comprising the step of reprogramming the pager in response to receiving the converted access signal.

36. The method in accordance with claim 35, further comprising the step of displaying an informational message in response to receiving the converted access signal.

37. The method in accordance with claim 35, further comprising the step hiding the access signal within a signal broadcasted in the selected one of the radio network and the television network.

* * * * *

UNITED STATES PATENT AND TRADEMARK OFFICE
CERTIFICATE OF CORRECTION

PATENT NO. : 5,828,311
DATED : October 27, 1998
INVENTOR(S) : Anders Östlund

It is certified that error appears in the above-identified patent and that said Letters Patent is hereby corrected as shown below:

Column 11,
Line 36, before "transmit" insert -- the --

Column 14,
Line 20, after "step" insert -- of --

Signed and Sealed this

Thirtieth Day of October, 2001

Attest:

*Attesting Officer*

NICHOLAS P. GODICI
*Acting Director of the United States Patent and Trademark Office*